United States Patent
Cere' et al.

(10) Patent No.: US 11,753,194 B2
(45) Date of Patent: Sep. 12, 2023

(54) SYSTEM AND METHOD FOR OPTIMIZING THE WRAPPING OF PALLETIZED LOADS WITH FILM AND WRAPPING METHOD FOR A WRAPPING MACHINE

(71) Applicant: AETNA GROUP S.P.A., Verucchio (IT)

(72) Inventors: Mauro Cere', Verucchio (IT); Massimiliano Vaccari, Verucchio (IT)

(73) Assignee: AETNA GROUP S.P.A., Verucchio (IT)

( * ) Notice: Subject to any disclaimer, the term of this patent is extended or adjusted under 35 U.S.C. 154(b) by 362 days.

(21) Appl. No.: 16/630,165

(22) PCT Filed: Jul. 12, 2018

(86) PCT No.: PCT/IB2018/055151
§ 371 (c)(1),
(2) Date: Jan. 10, 2020

(87) PCT Pub. No.: WO2019/012469
PCT Pub. Date: Jan. 17, 2019

(65) Prior Publication Data
US 2020/0165017 A1   May 28, 2020

(30) Foreign Application Priority Data
Jul. 13, 2017   (IT) .................. 102017000078655

(51) Int. Cl.
*B65B 11/02*   (2006.01)
*B25J 9/00*   (2006.01)
(Continued)

(52) U.S. Cl.
CPC ............... *B65B 11/02* (2013.01); *B25J 9/003* (2013.01); *B65B 57/02* (2013.01); *G01M 7/025* (2013.01); *G01M 7/06* (2013.01); *G06Q 10/083* (2013.01)

(58) Field of Classification Search
CPC ............ B65B 7/02; B65B 11/02; B65J 9/003; G01M 7/025; G01M 7/06; G01M 1/00; G06Q 10/083
See application file for complete search history.

(56) References Cited

U.S. PATENT DOCUMENTS 3,295,224 A * 1/1967 Cappel ..................... B23Q 1/48
248/163.1
5,610,344 A * 3/1997 Ueda ................... G01M 99/002
374/57
(Continued)

FOREIGN PATENT DOCUMENTS

| CN | 1290635 | 4/2001 |
|---|---|---|
| CN | 1605019 | 4/2005 |

(Continued)

OTHER PUBLICATIONS

International Search Report dated Sep. 20, 2018 in International (PCT) Application No. PCT/IB2018/055151.
(Continued)

*Primary Examiner* — Joshua G Kotis
*Assistant Examiner* — Scott A Howell
(74) *Attorney, Agent, or Firm* — Wenderoth, Lind & Ponack, L.L.P.

(57) ABSTRACT

A method determines a wrapping configuration of a film wrapped around products to form a palletized load to be moved along a path. The method includes using a defined wrapping configuration, measuring physical quantities acting on the load as a result of movements and/or stresses when the load is moved along different test paths, obtaining
(Continued)

a path as a suitable composition of base elementary path stretches, obtaining physical quantities acting on the load along the path as physical quantities associated to the base elementary path stretches, positioning the load on a motion platform, operating the motion platform based on the physical quantities to simulate movements and/or stresses acting on the load moved along the path, checking if the load has remained stable and/or compact, modifying the wrapping configuration if the load did not remain stable and/or compact, and repeating the steps.

18 Claims, 4 Drawing Sheets

(51) Int. Cl.
  *B65B 57/02* (2006.01)
  *G01M 7/02* (2006.01)
  *G01M 7/06* (2006.01)
  *G06Q 10/083* (2023.01)

(56) References Cited

U.S. PATENT DOCUMENTS

| | | | |
|---|---|---|---|
| 6,396,017 B1 | 5/2002 | Knickrehm | |
| 7,061,249 B2 | 6/2006 | Otsuka | |
| 8,403,673 B2 * | 3/2013 | Atluri | G09B 9/14 434/55 |
| 8,739,502 B2 | 6/2014 | Lancaster, III | |
| 9,280,918 B2 * | 3/2016 | Martinez | G01M 7/027 |
| 9,637,255 B2 * | 5/2017 | Field | B65B 11/02 |
| 9,776,748 B2 * | 10/2017 | Lancaster, III | B65B 11/58 |
| 10,053,253 B2 * | 8/2018 | Lancaster, III | B65B 11/585 |
| 2005/0104599 A1 | 5/2005 | Otsuka | |
| 2007/0245828 A1 * | 10/2007 | Nakajima | G01M 7/022 73/649 |
| 2007/0295822 A1 | 12/2007 | Kawai | |
| 2008/0092662 A1 * | 4/2008 | Mizuguchi | G01M 7/04 73/666 |
| 2012/0102886 A1 | 5/2012 | Lancaster, III | |
| 2014/0057245 A1 * | 2/2014 | Martinez | G01M 7/027 434/375 |
| 2016/0098171 A1 * | 4/2016 | Lancaster, III | G06F 3/04847 715/835 |
| 2016/0139577 A1 | 5/2016 | Seehof | |
| 2020/0165017 A1 * | 5/2020 | Cere' | B65B 57/14 |

FOREIGN PATENT DOCUMENTS

| | | |
|---|---|---|
| CN | 101099091 | 1/2008 |
| CN | 103548070 | 1/2014 |
| CN | 103662176 | 3/2014 |
| EP | 1 818 271 | 8/2007 |
| EP | 2 688 055 | 1/2014 |
| JP | 7-280735 | 10/1995 |
| JP | 2012-197136 | 10/2012 |
| WO | 2012/058549 | 5/2012 |

OTHER PUBLICATIONS

Office Action dated Apr. 14, 2021 in corresponding Chinese Patent Application No. 201880046507.7, with English-language translation.

* cited by examiner

SYSTEM AND METHOD FOR OPTIMIZING THE WRAPPING OF PALLETIZED LOADS WITH FILM AND WRAPPING METHOD FOR A WRAPPING MACHINE

The invention relates to machines, methods and systems for wrapping with a cold-extensible plastic film goods and products arranged on a pallet. In particular the invention relates to a simulation method and system for checking and/or determining an optimal wrapping configuration of a plastic film wrapped around a group of products arranged on a pallet such as to form a palletized load intended to be moved and/or transported along a transport defined path, in particular on-road. The invention also relates to a wrapping method that can be used by a wrapping machine for wrapping by means of a plastic film a group of products to form a stable and compact palletized load.

It is known and widespread in the industrial packaging industry the use of cold-extensible plastic film or coatings for wrapping and fixing to a pallet a plurality of products, duly stacked and grouped such as to form a palletized load which can be easily moved by a forklift and loaded on different types of transport means. In particular, products are bound and fixed together and to the pallet arranging the film so as to form a plurality of bands or stripes of film overlapped and twisted in an helix way.

The plastic film, before being wrapped around the products, is generally stretched or elongated, elastically and/or plastically.

Usually, the plastic film is elastically stretched for a predetermined quantity or percentage in order to be used at its best and assume physical-mechanical characteristics such as to make it more suitable to bear the forces acting on the load, in particular when it is moved and transported. More precisely, when the stretching force provided to the film to elongate it stops, the springback thereof causes a tightening force on the load allowing to hold and contain the products composing it and to secure the latter tightly to the underlying pallet. The wrapping tension or force provided to the film while wrapping around the load also contributes to such containment and wrapping effect.

The film stretching or elongation is expressed in percentage as a ratio between the elongation of the film (difference between the final length of the stretched film and the original length) and the original length. Typically the elongation provided to the film is comprised between 50% and 400%.

The stretching force further allows to significantly reduce the thickness of the film (typically from about 25-20 µm to about 6-7 µm) so as to proportionally increase its length in order to wrap a wider load perimeter with the same initial quantity of unwound film. This allows to reduce the film consumption and therefore the packaging costs.

The pre-stretching force also allows to change the mechanical characteristics of the film thereof. The duly stretched material of the film can in fact change its elastic behaviour, wherein the film tends to return to its original size once the stress is over, into a plastic behaviour, wherein the film undergoes a permanent deformation and does not return to its original size once the stress is over. In this last case the plastic film behaves as a flexible and inextensible element, as a rope or belt, and may be used for example to wrap groups of unstable products which must be kept tightly fastened together.

In order to carry out an efficient and stable wrapping it is therefore necessary to choose a suitable plastic film (composition, structure, initial thickness, etc.) and establish the correct wrapping parameters (pre-stretching percentage, wrapping force, number of film wrappings around the load, overlap percentage of the wrappings, arrangement of wrappings) as a function of both the characteristics of the load (type of product—fragile, deformable—number of products, composition of the rows and/or layers of the grouped products) and the type of transport path (on-road by truck, by ship, by plane etc.) which the load must be subjected to.

While the characteristics of the load and of the products or objects composing the load are known, the stresses and the forces it is subjected to during the transport are not generally known, for this reason, as known, a relevant percentage of palletized loads (especially in case of fragile or easily deformable products, for instance plastic bottles for beverages) are irremediably damaged during the transport due to the dynamic stresses (linear, angular acceleration/deceleration, vibrations, oscillations, etc.) they are subjected to. The palletized load can in fact tilt, bend laterally, undergo deformation and collapse locally as a result of stresses, thus provoking damaging, squeezing and/or breaking of the single products.

In addition to product deterioration and damage, the improper and incorrect wrapping of palletized loads and thus their collapse and/or deformation causes even serious accidents during the transport, in particular in case of on-road transport.

In order to overcome suck drawbacks one solution is wrapping the load as tightly as possible (consistently with the characteristics of the products contained) and with a high number of wrappings, on the basis of the acquired experience and empirical procedures. However, not always are wrappings free from problems and, furthermore, the consumption of plastic film increases considerably, with a relevant impact on manufacturing costs.

Therefore it is highly perceived the need in the packaging industry to optimize the wrapping or binding cycles of the palletized loads in order to obtain optimal containment and stabilization of the palletized load and, at the same time, a reduction of the quantity of film used, as a function of both the characteristics of the load and the transport type and path of the load.

Currently, wrapping machine manufacturers and/or producing companies carry out several tests on palletized loads to check the quality of the wrapping and try to find at the same time the optimal wrapping parameters for each type of load. However, these on-site tests, which provide for the movement and the transport of the palletized load onto the transport means along the concerned paths, are rather long, complex and expensive and they are not in any case able to provide information about the behaviour of a same palletized load which however has to be moved and transported along new paths different from the known and tested ones. Due to the lack of such information, the loads can be bound insufficiently or excessively.

It is also known measuring the stresses (displacements, rotations, speed, accelerations) by means of sensors fixed to the transport means (truck, ship, plane, etc.) on which the palletized load will be placed or fixed outside the load. Data related to the measured physical quantities are stored and used to calculate empirically and on the basis of previous tests and analysis the wrapping parameters that can be used for binding similar loads which have to be transported on similar transport means and along similar transport paths.

The thus obtainable results are in any case little precise and cannot be used with different transport paths or different types of load anyway. Furthermore, in the case of sensors applied to the transport means (for example on a support plane of the load), the measured data are imprecise as they do not take into consideration the composition and the structure of the transported load. In the case of sensors fixed outside the products it is noted that their positioning can affect the measurements themselves (as sensors modify the structure, the weight the dynamic behaviour of the load itself). Sensors can be subjected, due to the fixing mode, to particular stresses (vibrations) which the whole load is not subjected to.

An object of the present invention is to improve the known methods and systems for calculating and optimizing the processes for wrapping palletized loads with extensible plastic film.

Another object is to provide a simulation method and system enabling to calculate in a precise and accurate way physical quantities acting on a given palletized load so as to check and/or determine an optimal wrapping configuration of the film around the palletized load ensuring its stability and compactness during the transport along a defined transport path.

A further object is to provide a simulation method and a system enabling to calculate for any type of load and for any type of transport path an optimal wrapping configuration ensuring the necessary load containment and fixing and lesser film consumption.

A still further object is to provide a wrapping method for wrapping by means of a wrapping machine a group of products with a plastic film such to realize a palletized load which is stable and compact during the transport and the movement along a definite transport path.

In a first aspect of the invention it is provided a method for determining a wrapping configuration of a film around a palletized load according to claim 1.

In a second aspect of the invention it is provided a simulation system for determining a wrapping configuration of a film around a group of products for forming a palletized load according to claim 16.

In a third aspect of the invention it is provided a method for wrapping with a wrapping machine a determined group of products according to claim 20.

The invention shall be better understood and implemented referring to the enclosed drawings showing an exemplary and non limiting embodiment, wherein.

Figure 1:
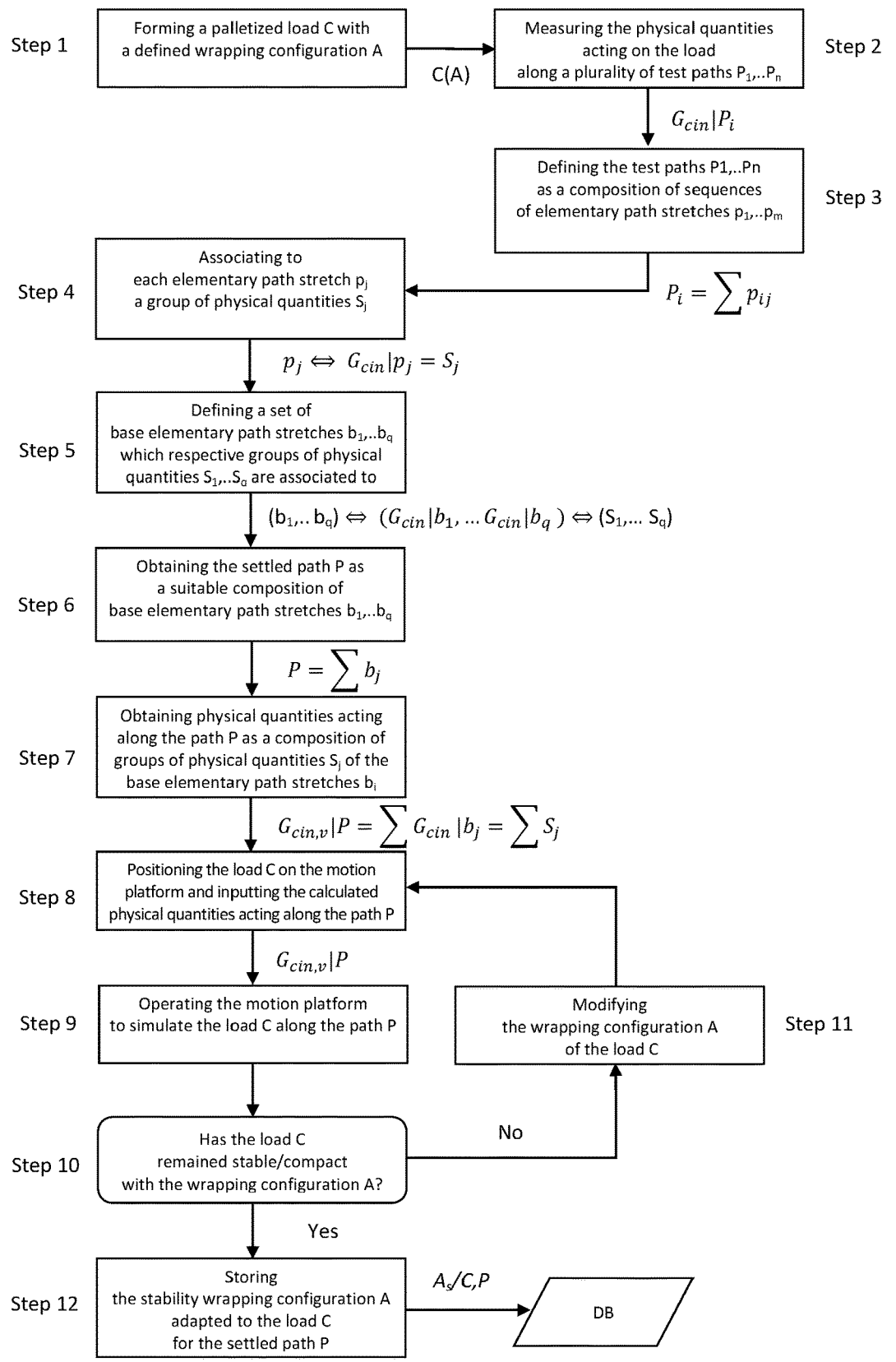
FIG. 1 is a block diagram illustrating the method according to the invention for checking and determining a wrapping configuration of a film wrapped around a palletized load.
Figure 2:
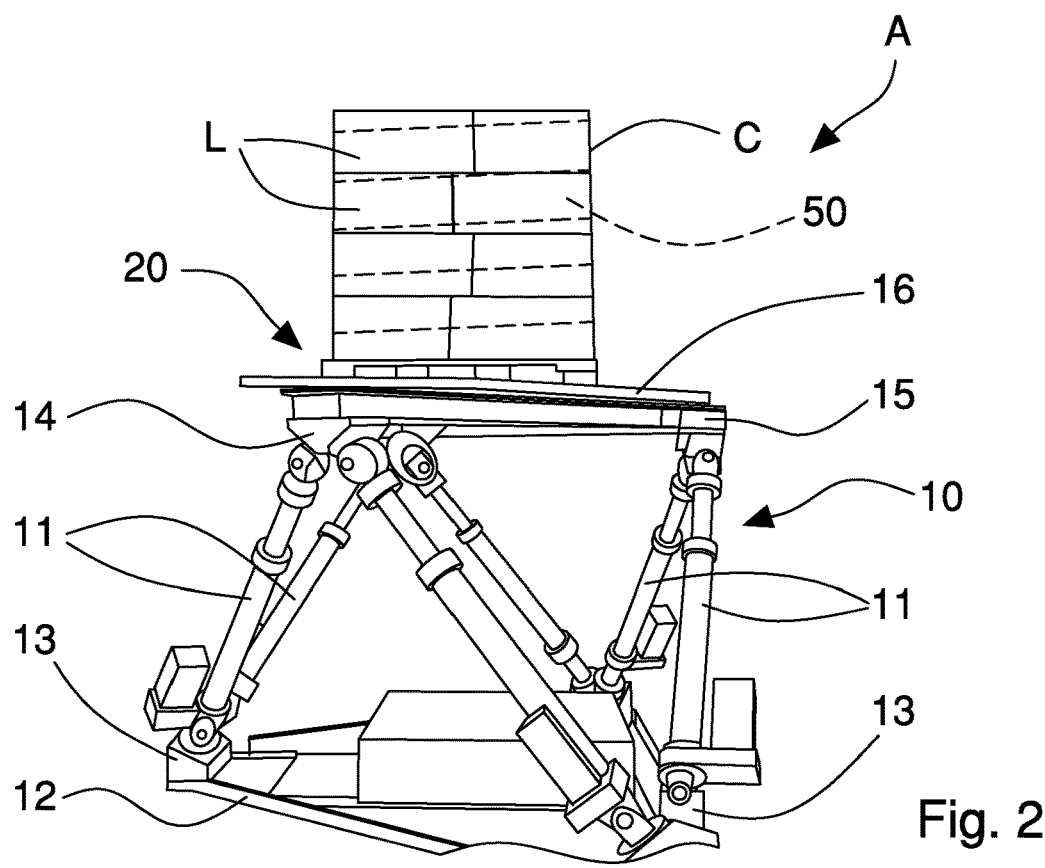
FIG. 2 is a perspective view of a simulation system of the invention.

Referring to the block diagram of FIG. 1, it is schematized the method according to the invention to determine a wrapping configuration A of a cold-stretchable plastic film 50, wrapped around a pre-determined group of products L to form a palletized load C intended to be moved and/or transported along a transport settled path P. More precisely, the method of the invention allows to determine which wrapping configuration of film 50 around the group of products L for forming the palletized load C guarantees that the latter remains stable and/or compact when it is moved along a transport settled path P, for example on-road by means of a truck.

Wrapping configuration A means a set of wrapping parameters which, with the same amount of plastic film used, define the wrapping process of the load or of the group of products and include, for example, a pre-stretching percentage applied to the film before the wrapping, a wrapping force of the film around the load, a number of film wrappings or bands around the load, an overlap percentage of bands, an arrangement of wrappings (overlapping at the base and/or at the top of the load, etc.).

In addition the wrapping configuration is a function of the characteristics of the palletized load, i.e. of the products composing it (fragile, deformable), of their number, of their composition in superimposed rows and/or layers and/or of the environmental conditions (temperature, humidity, pressure) which the palletized load is subjected to.

The method of the invention provides the hereinafter described steps.

In one first step (step 1) it is provided to form a palletized load C by grouping a determined group of products L and wrapping said group of products L with the film 50 according to a definite wrapping configuration A (obtaining the palletized load C (A), FIG. 1).

The palletized load C is identified and defined by specific characteristics comprising, in addition to the wrapping configuration A, the type of products L (bottle bundle, boxes, etc.), the strength and/or deformability of the products L, the number of products L, the composition of the rows and/or of the layers of the grouped products L.

In one second step (step 2) it is provided to detect and measure a set of physical quantities, in particular a set of kinematic-type quantities $G_{cin}$, comprising one or more of linear displacements, speed and accelerations along at least one axis and preferably along three orthogonal axes, and angular rotations, speed and accelerations around at least one axis and preferably around three orthogonal axis. These physical quantities act on the palletized load C as a result of movements and/or stresses which the latter is subjected to when it is moved along a plurality of different test paths $P_1$, $P_2$, ... $P_n$. More precisely, the palletized load C is subsequently and separately transported along each of the test paths $P_1$, $P_2$, ... $P_n$, in particular using the same transport means or same or similar transport means.

A respective set of said physical quantities $G_{cin}|P_1$, $G_{cin}|P_2$, ... $G_{cin}|P_n$ detected and measured by means of a measuring system 20, as better explained in the following description, at each moment or at regular time ranges during the transport of the palletized load C along the aforesaid test path $P_i$, is associated to each test path $P_i$ of said test paths $P_1$, $P_2$, ... $P_n$.

In one third step (step 3) it is provided to define each test path $P_1$, $P_2$, ... $P_n$. as a composition of a respective sequence of elementary path stretches $p_1$, $p_2$, ... $p_m$ ($P_i = \Sigma_{ij}$). More precisely, each test path $P_1$ can be composed as a set of elementary path stretches, linked, different and/or repeated between them, as for instance in the case of on-road truck transport, rectilinear stretches on the motorway, junctions, roundabouts, plane segments with curves, mountain segments with curves and hairpin turns, city paths, etc. The test paths $P_1$, $P_2$, ... $P_n$. and the elementary path stretches $p_1$, $p_2$, ... $p_m$ can be identified and defined by digital mapping or cartography systems, even on-line, for instance the Google Map © system or the like.

In one fourth step (step 4) the method provides to associate to each elementary path stretch $p_1, p_2, \ldots p_m$ a respective group of physical quantities $S_1, S_2, \ldots S_m$ detected and measured in the aforesaid respective elementary path stretch. In particular, a respective set of physical quantities $S_j$, in particular physical quantities $G_{cin}|p_j$, acting on the palletized load C wrapped by the film 50 according to the defined wrapping configuration A when moved along said elementary path stretch $p_j$, is associated to the single elementary path stretch $p_j$. In one fifth step (step 5) it is provided to define, from the elementary path stretches $p_1, p_2, \ldots p_m$ of the test paths $P_1, P_2, \ldots P_n$, a set of base elementary path stretches $b_1, b_2, \ldots b_q$, which respective groups of physical quantities $S_1, S_2, \ldots S_q$ are associated to and which are able to form, with a suitable composition, any transport path P of the palletized load C.

It should be noted that selecting an appropriate number of suitable test paths $P_1, P_2, \ldots P_n$, it is possible to identify a multiplicity of elementary path stretches $p_1, p_2, \ldots p_m$ which can be used to "reconstruct", by their suitable composition or combination, any type of transport path P along which the palletized load C can be moved.

In one sixth step (step 6) it is in fact provided to calculate and obtain the settled path P, for which it is desired to know the physical quantities acting on the palletized load C, as a suitable composition of base elementary path stretches ($P = \Sigma b_j$). In other words the transport settled path P is obtained as a composition or combination of a respective sequence of base elementary path stretches selected from the set of previously defined base elementary path stretches $b_1, b_2, b_q$. The base elementary path stretches composition or combination necessary to obtain or "reconstruct" the settled path P can as well be obtained by suitable digital mapping or cartography systems.

In one seventh step (step 7) it is therefore possible to determine the set of calculated physical quantities $G_{cin,v}|P$ acting on the palletized load C when it is moved along the aforesaid path P, such as a composition of a plurality of groups of physical quantities $S_1, S_2, \ldots S_q$ associated to respective base elementary path stretches $b_1, b_2, \ldots b_q$ of said suitable composition of base elementary path stretches composing said settled path P ($G_{cin,v}|P = \Sigma G_{cin}|b_j = \Sigma S_j$)

The method thus provides an eighth step (step 8) for positioning the palletized load C on a motion platform 10 adapted to support and move the palletized load C and inputting the set of calculated physical quantities $G_{cin,v}|P$ resulting from the previous step (step 7) as driving data of the motion platform 10.

As explained in detail in the hereinafter description, the motion platform 10 is a component of the simulation system 1 of the invention arranged to check and/or determine a wrapping configuration A of the plastic film 50 wrapped around the determined group of products L such as to form a palletized load C intended to be moved and/or transported along an established path P.

The motion platform 10 is, in particular, a swinging or vibrating platform provided with six degrees of freedom and able to support and move the palletized load C on the basis of the calculated physical quantities as acting on the palletized load C along the transport settled path P. In other words, the motion platform 10, suitably programmed and controlled, repeats movements, oscillations, forces, vibrations able to generate on the palletized load positioned thereon, physical quantities substantially equal to the physical quantities input as the input data.

In one ninth step (step 9) of the method it is therefore provided to operate the motion platform 10 on the basis of the set of calculated physical quantities $G_{cin,v}|P$ so as to perform a simulation of movements and/or stresses acting on the palletized load C moved and/or transported along the settled path P.

At the end of said simulation, in one tenth step (step 10) it is provided to check if the palletized load C wrapped with the film 50 according to the defined wrapping configuration A has remained stable and/or compact or if it has undergone deformation, bent or collapsed partially with resulting damage of the products composing it.

In case the verification provides a positive result, in one twelfth step of the method (step 12) the defined wrapping configuration A is stored as the stability wrapping configuration $A_s/C,P$ of the film 50 wrapped around the group of products L to form the palletized load C which maintains the latter stable and/or compact when it is moved and/or transported along the transport settled path P (with the movement and/or stresses simulation performed by the motion platform 10).

In case the verification provides negative result, i.e. the palletized load C is damaged, deformed, bent, etc., in one eleventh step (step 11) it is provided to modify the wrapping configuration A of the palletized load C and then repeat the steps of positioning, operating, checking and modifying, namely the previous steps 8-11 of the method until the determined palletized load C remains stable after the movement and/or stresses simulation performed by the motion platform 10.

In the subsequent twelfth step (step 12) the stability wrapping configuration $A_s/C,P$ of the film 50 wrapped around the determined group of products L to form the palletized load C which maintains the latter stable and/or compact when it is moved and/or transported along the settled path P is therefore stored.

The stability wrapping configuration $A_s/C,P$ is stored in a specific database DB.

Such a stability wrapping configuration $A_s/C,P$ can therefore be advantageously used by a wrapping machine for realizing a stable and/or compact palletized load.

Thanks to the method of the invention it is therefore possible to determine a stability wrapping configuration $A_s/C,P$ of a plastic film 50 wrapped around a group of products L to form a palletized load C able to maintain the latter stable and/or compact when moved and/or transported along any desired transport path P. The latter can in fact be obtained or "reconstructed" as suitable composition or combination of base elementary path stretches $b_1, b_2, \ldots b_q$, for instance by means of suitable digital mapping or cartography systems. As a group of physical quantities $S_1, S_2, \ldots S_q$, acting on the palletized load C when it is moved along said base elementary path, is associated to each base elementary path stretches $b_1, b_2, \ldots b_q$, the set of physical quantities $G_{cin,v}|P$ acting on the palletized load C when it is moved along the aforesaid settled path P is obtained as composition of the set of groups of physical quantities $S_1, S_2, \ldots S_q$ associated with respective base elementary paths $b_1, b_2, \ldots b_q$ of the composition of base elementary path stretches composing the path P.

As it is possible to obtain (as suitable composition of base elementary path stretches) an extremely precise and detailed transport path P, the simulation of movements and/or stresses acting on the palletized load C performed operating the platform 10 (on the basis of the set of calculated physical quantities $G_{cin,v}|P$ associated with the aforesaid path P) is extremely realistic and plausible and, as highlighted by the several tests performed by the applicant, comparable to an on-site test performed by moving and/or transporting the palletized load C thereof by a transport means (truck) along the transport path P.

The method of the invention further provides to wrap by a wrapping machine the plastic film 50 around a group of products substantially identical to the determined group of products L such as to form a palletized load intended to be moved and/or transported along the same transport settled path P using the stability wrapping configuration $A_s/C, P$, previously determined and stored.

In one variant of the method according to the invention it is further provided in the second step (step 2) to detect and measure additional physical quantities acting on the palletized load C, in particular a set of environmental-type physical quantities $G_{amb}$, for instance temperature, pressure, humidity which the palletized load is subjected to when it is moved along a plurality of different test paths $P_1, P_2, \ldots P_n$. In this case, in addition to the respective set of physical quantities $G_{cin}|P1$, a respective set of further detected and measured physical quantities $G_{amb}|P_i$ can be associated to each test path $P_i$ of said test paths $P_1, P_2, \ldots P_n$.

In such variant of the method, it can thus be provided before operating the motion platform 10, for example after obtaining in the seventh step (step 7) the set of calculated physical quantities $G_{cin,v}|P$ acting on the palletized load C along the settled path P, to associate to the latter a set of additional physical quantities (temperature, pressure, humidity) acting on the palletized load C.

In other words, also on the basis of the values of the additional detected and measured physical quantities $(G_{amb}|P_i)$ acting on the palletized load C along the different test paths $P_1, P_2, \ldots P_n$, a set of calculated additional physical quantities $G_{amb,v}|P$ is set plausibly acting on the palletized load along the settled path P.

Consequently, in the ninth step (step 9) it is provided to operate the motion platform 10 on the basis of the set of physical quantities $G_{cin,v}|P$ calculated in the seventh step and at the same time to submit the palletized load C to the set of calculated additional physical quantities $G_{amb,v}|P$, in order to perform a simulation of movements and/or stresses and temperature, humidity, pressure acting on the palletized load C moved and/or transported along the settled path P.

The method of the invention further provides to define a plurality of different palletized loads $C_i$ each of which is obtained grouping a set of respective groups of products Li and wrapping them with the film 50 according to a respective wrapping configuration Ai. The characteristics of each palletized load $C_i$ comprise the type of grouped products Li (box, plastic bottle bundle, glass bottle box, etc.), product strength and/or deformability, number of products grouped on the pallet, their composition in superimposed rows and/or layers.

For each palletized load of said plurality of palletized loads $C_i$ it is provided to repeat the steps 1 to 12 of the method and eventually step 11 until identifying a respective stability wrapping configuration $A_{is}/C_i,P$ of the film 50 wrapped around the group of products $L_i$ to form the respective palletized load $C_i$ maintaining the latter stable and or compact when it is moved and/or transported along the settled path P (with the simulation of movements and/or stresses performed by the motion platform 10).

The stability wrapping configurations $A_{is}/C_i,P$ for each palletized load of said plurality of palletized loads $C_i$ are stored, in particular in a database DB.

In this case also, the stability wrapping configurations $A_{is}/C_i,P$ previously determined and stored in the database DB can advantageously be used by a wrapping machine to obtain respective stable and/or compact palletized loads $C_i$ to be moved and/or transported along the settled path. More precisely, based on the determined palletized load $C_i$ to be moved and/or transported along the settled path P, the wrapping machine uses the stability wrapping configuration $A_s/C, P$ among the ones previously determined and stored in the database DB ensuring the stability and compactness of the aforesaid palletized load $C_i$ along the settled path P.

The method of the invention further provides for the palletized load C, e.g. for each of the different palletized loads $C_i$ to calculate, by repeating steps 6 to 12, the stability wrapping configurations $A_s/C,P_k$ for respective settled paths $P_k$ obtained as suitable corresponding compositions of base elementary path stretches in step 6.

Such stability wrapping configurations $A_s/C_i,P_k$ for said palletized load C, for example. for each palletized load of said plurality of palletized loads $C_i$, and for each transport and movement path $P_k$, are stored, in particular in the database DB, and are available for use in a wrapping machine.

The method of the invention can also be used for a same group of products L, or corresponding palletized load C, for determining the wrapping configuration, in particular the stability wrapping configurations, obtainable with respective different plastic films, that is with plastic films having different composition, structure, initial thickness, etc.

More precisely, the method of the invention may provide to define a plurality of different palletized loads $C_{if}$ each of which obtained grouping one same group of products L and wrapping said group of products with different respective films according to respective wrapping configurations $A_i$. In this case the palletized loads $C_{if}$ only differ for the different plastic film used for wrapping them. For each palletized load of said plurality of palletized loads $C_{if}$, it is provided to repeat steps 1 to 12 of the method and eventually step 11 until identifying a respective stability wrapping configuration $A_{is}/C_{if},P$ of the corresponding film wrapped around the respective palletized load $C_{if}$ maintaining the latter stable and/or compact when it is moved and/or transported along the settled path P.

The stability wrapping configurations $A_{is}/C_{if},P$ for each palletized load of said plurality of palletized loads $C_{if}$ are stored, in particular in the database DB.

Referring to step 1 of the method of the invention, forming the palletized load C comprises associating the respective group of products L with a measuring system 20 and wrapping the group of products L and the measuring system 20 with the film 50 according to the defined wrapping configuration A.

It is thus provided to detect and measure by a measuring chain of the measuring system 20 the physical quantities $G_{cin}$ acting on the palletized load C when moved and transported, as explained more in detail in the following description.

The invention also comprises a method for wrapping with a wrapping machine a determined group of products L with a plastic film 50 to form a palletized load C to be moved and/or transported along a transport settled path P, said method comprising wrapping the determined group of products L with the film 50 using a stability wrapping configuration $A_s/C,P$ determined by the method previously described and illustrated by the bloc diagram of FIG. 1.

More precisely, the aforementioned wrapping method allows a wrapping machine to wrap a determined group of products L such as to realize a palletized load C which is stable and/or compact when it is moved and/or transported along a settled path P with no need to perform specific practical on-site tests (i.e. testing the stability of one or more test palletized loads C moved and/or transported on a transport means along the settled path P), but using the stability wrapping configuration $A_s/C,P$ determined by the method of the invention for that palletized load C along the settled path P.

The stability wrapping configuration $A_s/C,P$ needed by the wrapping machine may as well be included in a group of stability wrapping configurations $A_{is}/C_i,P$ previously determined and stored in a database DB by the method of the invention for a plurality of different palletized loads $C_i$ moved and/or transported along the settled path P, the palletized load C to be wrapped by the wrapping machine substantially corresponding to one of the aforesaid different palletized loads $C_i$.

Referring to FIGS. 2 to 6, the simulation system 1 of the invention for checking and/or determining a wrapping configuration A of a plastic film 50 wrapped around a group of products L to form a palletized load C intended to be moved and/or transported along a transport settled path P, comprises a motion platform 10 provided with six degrees of freedom and arranged to support and move the palletized load C on the basis of the physical quantities $G_{cin,v}|P$ calculated as acting on the palletized load C when it is moved and/or transported along the path P.

More precisely, the set of physical quantities $G_{cin,v}|P$ calculated by the above described method of the invention and particularly in the seventh step, is input as a set of driving data of the motion platform 10. Thereby, the latter duly programmed and controlled is able to repeat movements, oscillations and vibrations and generate on the palletized load C positioned thereon physical quantities substantially equal to the physical quantities $G_{cin,v}|P$ input as driving data namely it is able to simulate the transport and/or movement of the palletized load C along the path P.

The motion platform 10 preferably comprises a parallel kinematic robot, in particular a robot with six extensible legs 11, known also with the term Gough-Steward platform. This motion platform has high dynamic performances, high structure stiffness and high movement precision.

Figure 3:
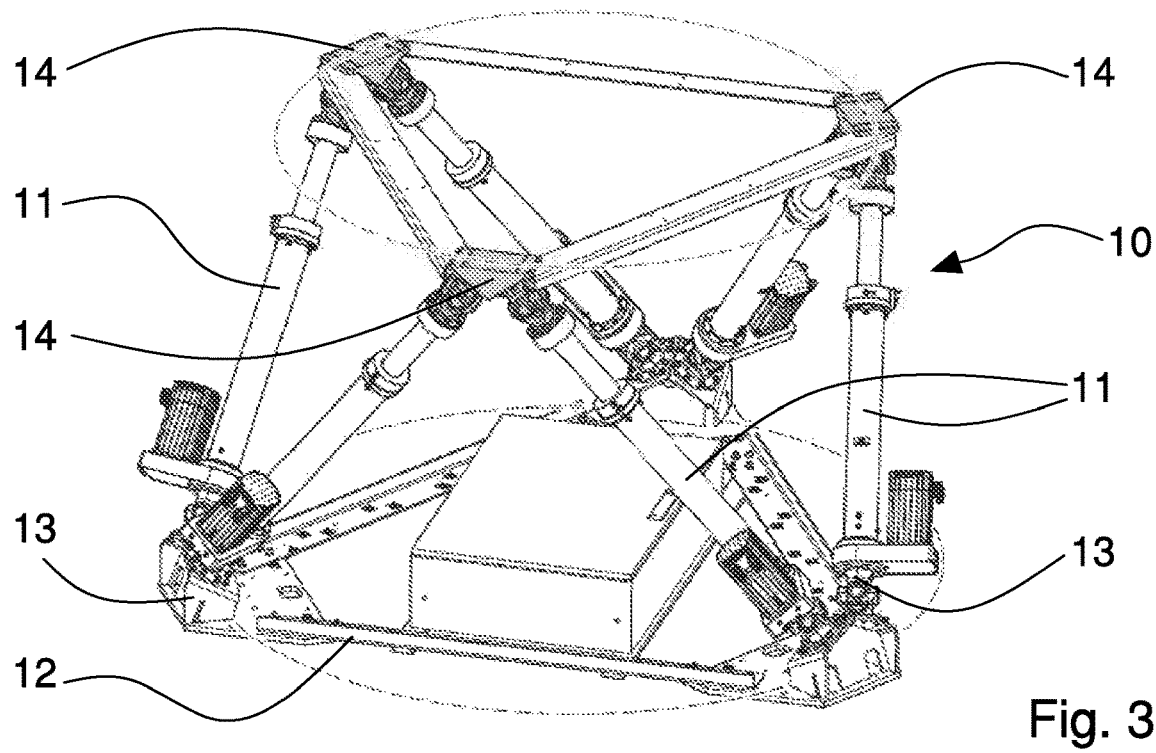
FIG. 3 is a perspective view of a motion platform of the simulation system of FIG. 2.
Figure 4:
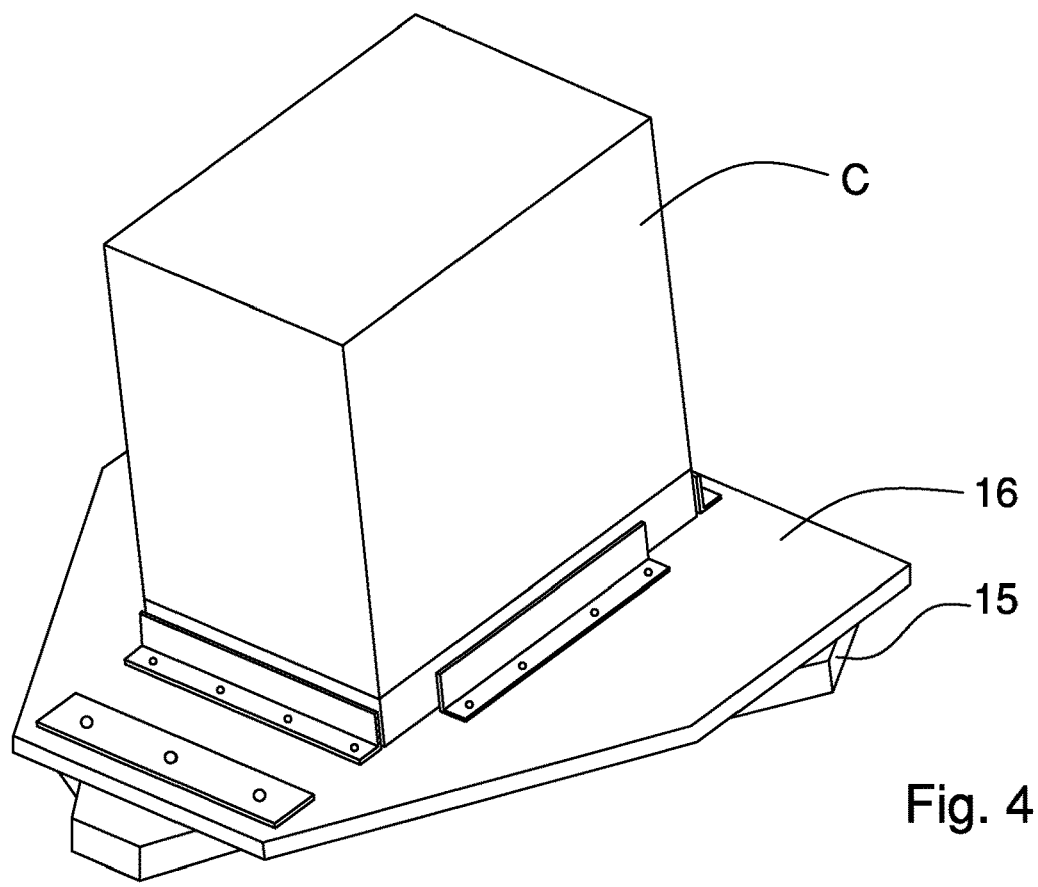
FIG. 4 shows a perspective view of a movable base and a supporting flatbed that can be fixed to the motion platform of FIG. 2 to support the palletized load.
Figure 5:
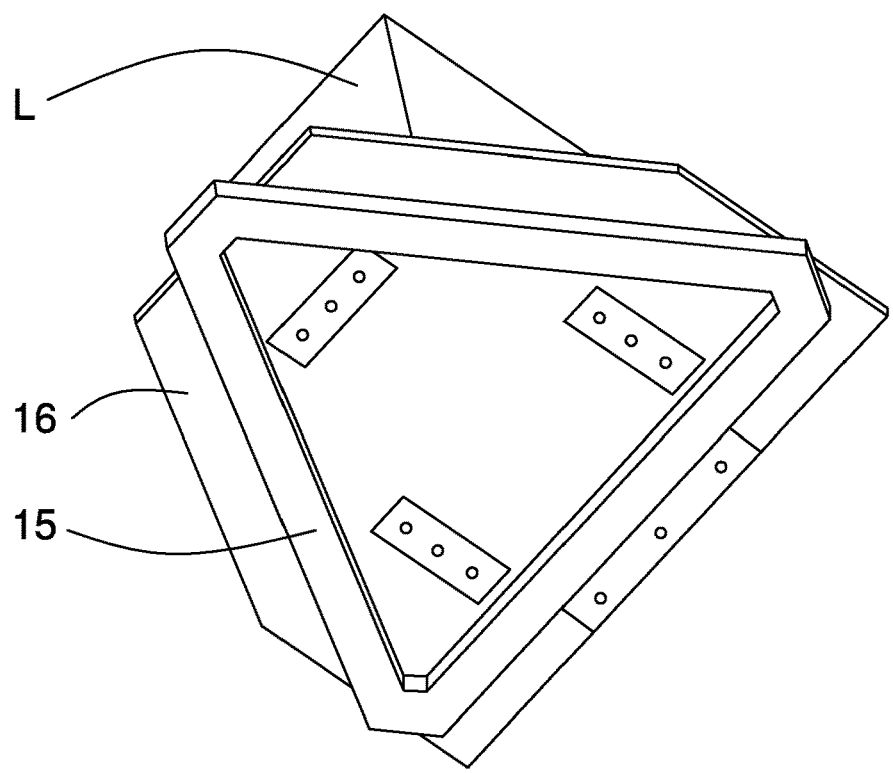
FIG. 5 is a perspective view from below of the movable base and of the supporting flatbed of FIG. 4.

As illustrated in particular in FIG. 3, the motion platform 10 comprises a lower base 12 that can be fixed to the floor and substantially triangular-shaped at which vertices linear actuators 11 constituting the extensible legs are fixed by means of lower joints 13. More precisely the lower ends of two respective linear actuators 11 are fixed at each vertex of the lower base 12.

The motion platform 10 also comprises a higher movable base 15 connecting the linear actuators 11 and it is provided with a higher flatbed 16 whereto the palletized load C can be fixed. More precisely, the higher movable base 15 is fixed at the higher ends of linear actuators 11. In particular, the higher base 15 is fixed at three higher joints 14, each of which arranged for connecting the higher ends of two linear actuators 11 whose lower ends are fixed at two adjacent vertices of the lower base 12.

The lower joints 13 and higher joints 14 allow rotation according to two degrees of freedom.

Figure 7:
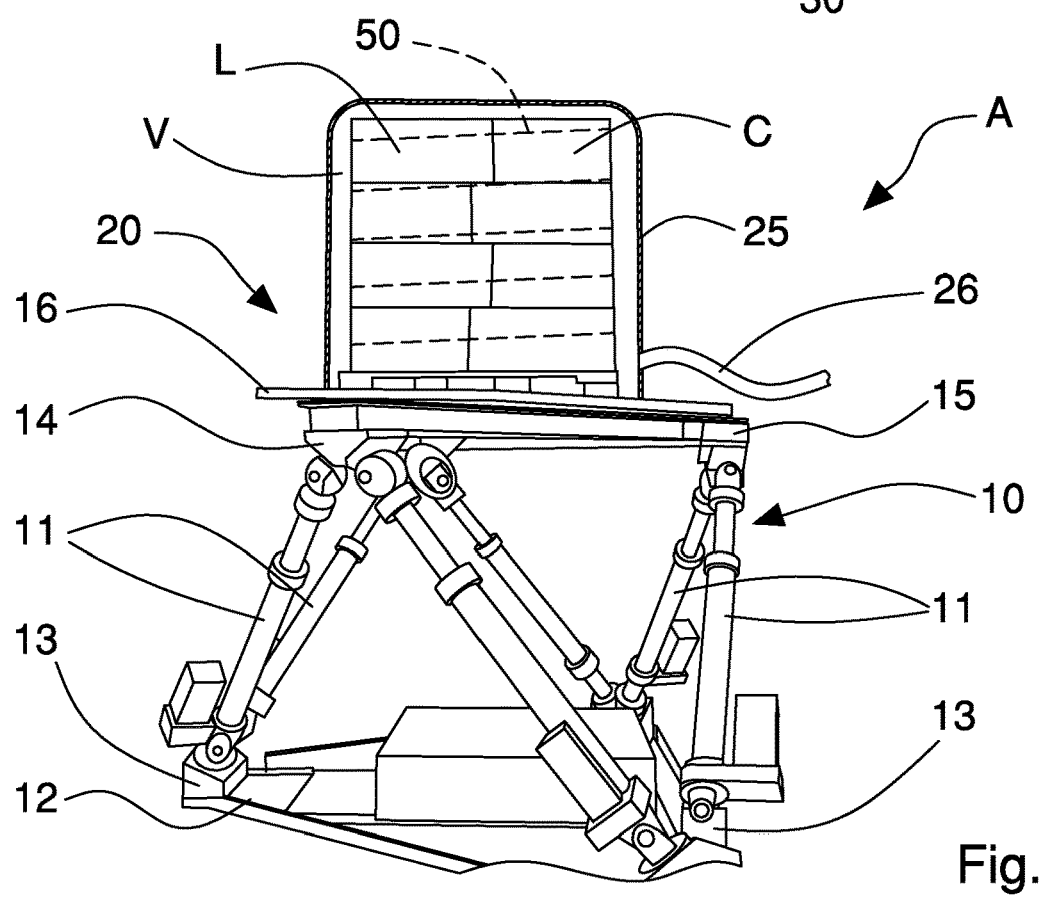
FIG. 7 is a variant of the simulation system of the invention.

Referring in particular to FIG. 7, the simulation system 1 according to the invention can comprise a covering casing 25 arranged for air-tightly embedding the palletized load C when positioned above the motion platform 10 so as to create an inner environment V, containing the palletized load C, wherein reproducing the set of calculated additional physical quantities $G_{amb,v}|P$ (environmental-type physical quantities, e.g. temperature, pressure, humidity) which the palletized load C is subjected to when it is moved and/or transported along the path P, during the simulation carried out by the motion platform 10. To this end, the covering casing 25 is fixed to the higher flatbed 16 of the motion platform 10 and linked by at least a connecting tube 26 to a conditioning system, of the known type and not shown in the figures, able to recreate the further desired physical quantities in the inner environment V.

Alternatively, the simulation system 1 of the invention can comprise a climatic chamber, of the known type and not shown in the figures, able to contain the whole motion platform 10 with the palletized load C and to reproduce during the simulation the set of additional physical quantities (temperature, pressure, humidity) which the palletized load C is subjected to when it is moved and/or transported along the path P.

Figure 6:
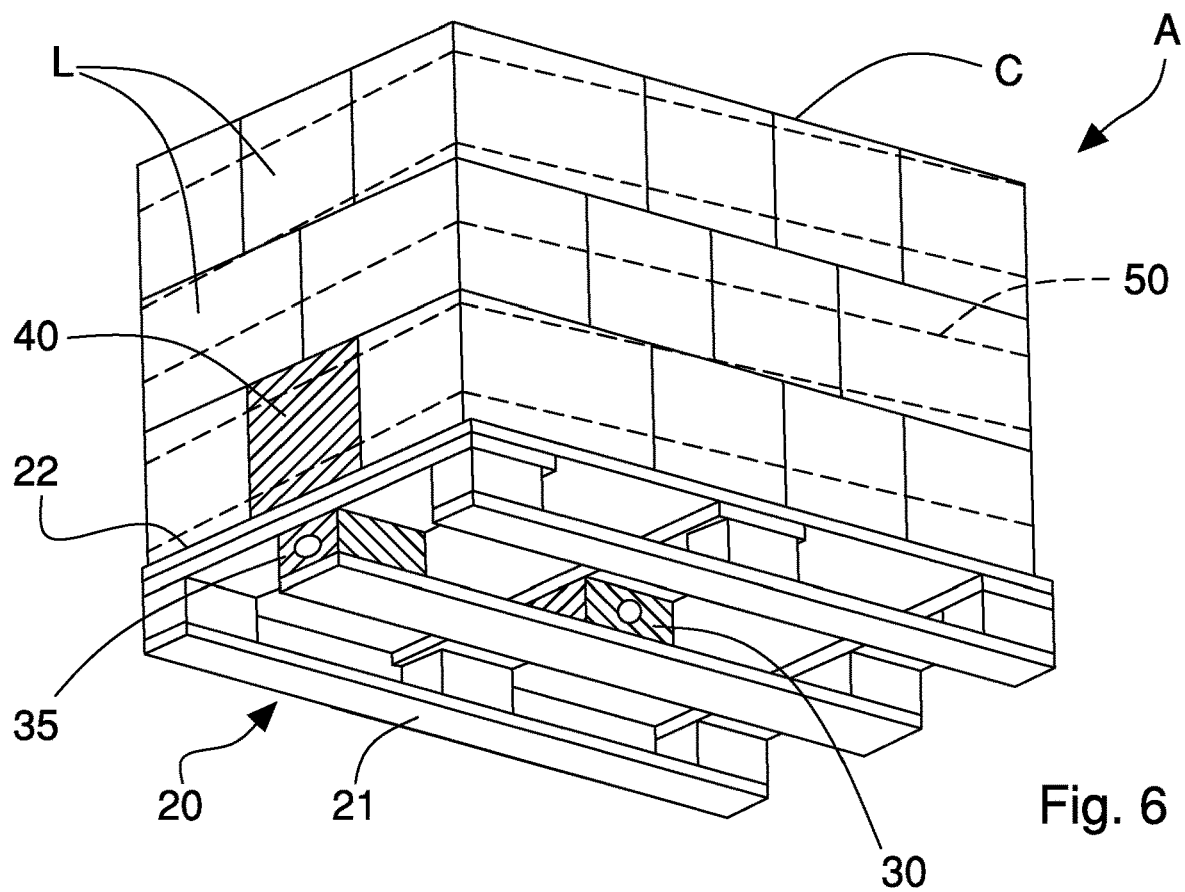
FIG. 6 is a perspective view of a measuring system of the simulation system associated to a plurality of products to form a palletized load.

Referring to FIG. 6, it is schematically illustrated the measuring system 20 adapted to receive and support the group of products L with which it will be wrapped with the film 50 according to a definite wrapping configuration A so as to form the palletized load C and able to detect and measure the physical quantities acting on said palletized load C when it is moved and/or transported along a transport path, in particular a test path $P_1, P_2, \ldots P_n$.

More precisely and referring to the method of the invention, the measuring system 20 is used to form the palletized load C wrapped by the film 50 with the defined wrapping configuration A and thus moved by means of ordinary transport means (e.g. a truck) along the different test paths $P_i, P_2, \ldots P_n$ such as to detect and measure the respective set of physical quantities $G_{cin}|P_i$.

The palletized load C itself with the measuring system 20 is further used on the motion platform 10 to check that the physical quantities generated by the motion simulation and measured by the measuring system are substantially equal to the physical quantities $G_{cin,v}|P$ input as input data in the motion platform.

The measuring system 20 is also used to realize the plurality of different palletized loads $C_i$ each of which obtained by grouping a set of respective products $L_i$ on a pallet and wrapping the products $L_i$ and the measuring system 1 with the film 50 according to a respective wrapping configuration $A_i$. For each palletized load $C_i$ thus realized it is provided to repeat the steps 1 to 10 of the method of the invention and eventually step 11 until identifying a respective stability wrapping configuration $A_{is}$ of the film 50 wrapped around the respective palletized load $C_i$ maintaining the latter stable and or compact when it is moved and/or transported along the settled path P (with the simulation of movements and/or stresses performed by the motion platform 10).

The measuring system 20 comprises a measuring chain able to detect and measure physical quantities $G_{cin}$ acting on the palletized load C when it is moved and transported.

More precisely, the measuring system 20 comprises a supporting frame 21, or pallet, provided with a supporting plane 22 for products L and a detection module 30 housed inside the supporting frame 21 and provided with sensor means to detect and measure the physical quantities $G_{cin}$ acting on the palletized load C. The sensor means are adapted to detect and measure said physical quantities, in particular of kinematic-type, in particular linear displacements, speed and accelerations along three orthogonal axis and angular rotations, speed and accelerations according to three orthogonal axis and/or combinations of such physical quantities.

The measuring system 20 further includes a processing module 40 that can be positioned on the support plane 22 interposed and adjacent to the products L and arranged to be wrapped by the film with the latter. The processing module 40 comprises a processing unit connected to the detection module 30 to receive and process data relative to physical quantities $G_{cin}$ and to store them into a storage unit. The processing unit, the storage unit and the detection module 30 form the measuring chain of the physical quantities $G_{cin}$.

It is also provided that the measuring system 20 comprises an additional detection module 35 housed as well in the supporting frame 21 and provided with sensor means arranged to detect and measure the additional physical quantities $G_{amb}$ acting on the palletized load C. The additional sensor means are adapted to detect and measure the additional physical quantities, in particular environmental-type physical quantities $G_{amb}$, in particular temperature, pressure, humidity of an environment wherein the palletized load C remains during the transport along the path.

In this case the detection module 40 includes an additional processing unit connected with the additional detection module 35 to receive and process data related to the additional physical quantities $G_{amb}$ and thus store them on an additional storage unit. The additional processing unit, the additional storage unit and the additional detection module form an additional measuring chain of the additional physical quantities $G_{amb}$.

The invention claimed is:

1. A method for determining a wrapping configuration of a plastic film that is wrapped around a group of products to form a palletized load intended to be moved or transported along a transport settled path, said method comprising the following steps:
   Step 1, forming a palletized load by grouping and wrapping with the film a determined group of products by using a defined wrapping configuration;
   Step 2, detecting and measuring a set of physical quantities, the physical quantities including at least kinematic-type quantities that comprise one or more of linear displacements, speed and accelerations along at least one axis and angular rotations, speed and accelerations about at least one axis, the kinematic-type quantities acting on the palletized load as a result of at least one of movements and stresses that the palletized load is subjected to when the palletized load is moved along a plurality of different test paths and associating to each of the test paths one respective set of the physical quantities detected and measured;
   Step 3, defining each of the test paths as a composition of a respective sequence of elementary path stretches, the test paths and the elementary path stretches being identified and defined by at least one of a digital mapping or cartography system;
   Step 4, associating to each of the elementary path stretches a respective group of physical quantities detected and measured in the elementary path stretch;
   Step 5, defining from the elementary path stretches of the test paths a set of base elementary path stretches which respective groups of physical quantities are associated to and that are able to form with a suitable composition any path of the palletized load;
   Step 6, obtaining the transport settled path as a suitable composition of base elementary path stretches selected by the set of base elementary paths;
   Step 7, obtaining calculated physical quantities that act on the palletized load along the transport settled path as a composition of groups of physical quantities associated to base elementary path stretches of the suitable composition of base elementary path stretches that compose the transport settled path;
   Step 8, positioning the palletized load on a motion platform adapted to support and move the palletized load and inputting the calculated physical quantities as driving data of the motion platform;
   Step 9, operating the motion platform on the basis of the calculated physical quantities to perform a simulation of at least one of movements and stresses that act on the palletized load moved or transported along the transport settled path;
   Step 10, at an end of the simulation, checking if the palletized load wrapped with the film according to the defined wrapping configuration has remained stable and compact;
   Step 11, modifying the defined wrapping configuration if the palletized load did not remain stable and compact and repeating said steps 8 to 11 of said positioning, said operating, said checking and said modifying until the palletized load is stable and compact; and
   Step 12, storing a stability wrapping configuration of the film wrapped around the determined group of products adapted to maintain the palletized load stable and compact when the palletized load is moved or transported along the transport settled path,
   wherein each of the test paths represents motion of the palletized load in three-dimensional space about three orthogonal axes and is stored as an executable program, and
   wherein the digital mapping or cartography system shows test path locations of the palletized load over a time interval.

2. The method according to claim 1, further comprising wrapping with a wrapping machine the film around a group of products equal to the determined group of products so as to form a palletized load intended to be moved or transported along the transport settled path by using the stability wrapping configuration.

3. The method according to claim 1, further comprising obtaining the transport settled path as a suitable composition of base elementary path stretches selected from the set of base elementary paths by at least one of the digital mapping or cartography system.

4. The method according to claim 1, further comprising:
   defining a plurality of palletized loads, each of the palletized loads being obtained by grouping a group of respective products, and wrapping each of the groups of products with the film according to a respective wrapping configuration;
   repeating for each of the palletized loads said steps 1 to 11 until identifying a respective stability wrapping configuration of the film, that is wrapped around the group of respective products to form the palletized load, adapted to maintain the palletized load stable and compact when moved or transported along the transport settled path; and
   storing respective stability wrapping configurations for each palletized load of the plurality of palletized loads.

5. The method according to claim 1, further comprising for said palletized load calculating, by repeating said steps 6 to 12, stability wrapping configurations for respective obtained transport settled paths, as corresponding suitable compositions of base elementary path stretches.

6. The method according to claim 1, comprising:
   defining a plurality of palletized loads, each of the palletized loads being obtained by grouping one same group of products, and wrapping each of the groups of products with a respective defined plastic film and according to a respective wrapping configuration;

repeating for each of the plurality of palletized loads said steps 1 to 11 until identifying a respective stability wrapping configuration of the respective defined film wrapped around the group of products to form the palletized load, adapted to maintain the palletized load stable and compact when moved or transported along the transport settled path; and storing respective stability wrapping configurations for each palletized load of the plurality of palletized loads.

7. The method according to claim 1, wherein the wrapping configuration of the film around the palletized load comprises wrapping parameters that include a film pre-stretching percentage, a wrapping force of the film around the palletized load, a number of film wrappings around the palletized load, an overlap percentage of wrappings, an arrangement of wrappings, and wherein the wrapping parameters are a function of characteristics of at least one of the palletized load and the transport settled path.

8. The method according to claim 7, wherein the characteristics of the palletized load comprise type of products, strength or deformability of products, number of products, composition in superimposed rows or layers of the grouped products.

9. The method according to claim 1, wherein said forming of the palletized load comprises associating the group of products to a measuring system and wrapping the group of products and the measuring system with the film according to the defined wrapping configuration.

10. The method according to claim 9, wherein said detecting and measuring of the set of physical quantities that act on the palletized load is performed with a measuring chain of the measuring system.

11. The method according to claim 1, wherein the physical quantities further include environmental-type physical quantities that comprise temperature, pressure and humidity.

12. The method according to claim 11, further comprising, during said operating of the motion platform on the basis of the calculated physical quantities, subjecting the palletized load to the environmental-type physical quantities.

13. The method according to claim 1, further comprising associating to the transport settled path obtained as the suitable composition of base elementary path stretches, a set of calculated environmental-type physical quantities that act on the palletized load.

14. A simulation system for determining a wrapping configuration of a plastic film that is wrapped around a determined group of products to form a palletized load to be moved or transported along a transport settled path implementing the method according to claim 1, wherein said simulation system comprises the motion platform provided with six degrees of freedom and arranged to support and move the palletized load on the basis of physical quantities calculated as acting on the palletized load along the transport settled path, and wherein the physical quantities include at least kinematic-type quantities that comprise one or more of linear displacements, speed and accelerations along at least one axis and angular rotations, speed and accelerations about at least one axis.

15. The simulation system according to claim 14, wherein the motion platform comprises a parallel kinematic robot.

16. The simulation system according to claim 14, wherein the motion platform comprises a parallel kinematic robot with six extensible legs and a movable base which can be connected to the six extensible legs, and wherein the movable base is provided with an upper flatbed onto which the palletized load can be positioned.

17. The simulation system according to claim 14, further comprising a covering casing arranged for air-tightly embedding the palletized load when positioned on the motion platform so as to create an inner environment that contains the palletized load, wherein a set of calculated physical quantities, that include environmental-type physical quantities, which the palletized load is subjected to when the palletized load is moved along the transport settled path, is reproduced.

18. The simulation system according to claim 14, further comprising a climate chamber adapted to contain the motion platform that supports the palletized load and to replicate a set of physical quantities that include environmental-type physical quantities which the palletized load is subjected to when the palletized load is moved along the transport settled path.

* * * * *